3,087,897
PROCESS OF MAKING A CORROSION INHIBITING COMPOSITION

Tore Per Gustav Stedt and Åke Adolf Herman Dolph, Nasbypark, Sweden; said Dolph assignor to said Stedt
No Drawing. Filed June 20, 1957, Ser. No. 667,047
Claims priority, application Sweden June 20, 1956
6 Claims. (Cl. 252—391)

This invention relates to rust or corrosion preventive or inhibiting compositions and a process of making them. The composition is substantially characterized in that it contains salts of organic acids with trialkanolamines optionally mixed with ammonium salts and/or alkali metal salts of organic acids and esters of organic acids and polyhydric alcohols, the molecular weight of the acid radical of the salts and the esters being not less than the molecular weight of lauric acid.

The alkali metals are preferably sodium and potassium. Alkyl amines, alkylaryl amines and heterocyclic amines may be used. Preferably, trialkanol amines, e.g. triethanolamine, are used.

The acids which form the salts and esters included in the composition of the invention may be fatty acids and/or rosin acids both optionally being polymerized. The fatty acids may be separate pure chemical compounds or mixtures thereof or mixtures of fatty acids obtained from animal and vegetable fats. The fatty acids of the composition of the invention may thus be lauric, myristic, palmitic, stearic, arachidic acid etc. and other saturated acids. Further, unsaturated acids may be used such as oleic, elaidic, linolic, linoleic acid etc. and others of the same unsaturated series. Mixtures of fatty acids obtained from natural products and optionally refined may also be used such as acids from olive oil, sesame oil, soya oil, cotton seed oil, palm oil, coconut oil and other vegetable fats and lard, tallow, beeswax, wool fat and other animal fats. Further, tall oil fatty acids usually containing rosin acids, e.g. abietic acid, may be used. Among the rosin acids which may be included in the composition of the invention, tall oil rosin acids, colophony and especially abietic acid may be mentioned. From the acids mentioned above acids obtained from wool fat and beeswax and refined tall oils containing a minor amount, 10 to 20% by weight, rosin acid are preferred.

The polyhydric alcohols of the composition according to the invention are glycols, glycerins, tetritols, e.g. erythritol and pentaerythritol, pentitols, e.g. arabite, xylite and/or hexitols, e.g. sorbitol and mannitol. The glycols may be ethylene and/or propylene glycols, e.g. ethylene glycol, diethylene glycol, triethylene glycol, polyethylene glycol and the corresponding propylene glycols. The glycerines may be glycerine and polymerized glycerine.

The rust preventive composition of the invention has, besides corrosion inhibiting or preventive properties, also lubricating properties and is intended to be added to water, surface active agents, oils, waxes, lubricants, bore oils, coolants, e.g. glycol and methylated spirits (red spirit) and the like which contact metals, especially iron, steel and copper, the products thus being used as rust inhibiting agents as well as lubricants.

Some specific compositions of the invention are listed below:

(1)

| | Percent by weight |
|---|---|
| Triethanolamine salt of refined tall oil fatty acid | 40 |
| Polyglycol ester of refined tall oil fatty acid | 40 |
| Triethanolamine salts of wool fatty acids | 20 |

(2)

| | Percent by weight |
|---|---|
| Potassium salt of abietic acid | 10 |
| Polyglycol ester of abietic acid | 40 |
| Triethanolamine salts of beeswax fatty acids | 50 |

(3)

| | |
|---|---|
| Potassium salt of polymerized abietic acid | 10 |
| Polyglycol ester of polymerized abietic acid | 40 |
| Triethanolamine salts of wool fatty acids | 50 |

(4)

| | |
|---|---|
| Sodium salt of abietic acid | 10 |
| Glycerol ester of abietic acid | 40 |
| Triethanolamine salts of wool fatty acids | 50 |

The compositions of the invention may, in addition to the salts and the esters given above, also contain unreacted acids and/or fats and excess amine, especially triethanolamine. The composition may also contain lubricants known per se.

In order to improve the corrosion inhibiting and preventive properties of the composition according to the invention, sulphur and/or organic sulphur compounds may be added.

Sulphur conveniently as flowers of sulphur is preferably added to compositions of the invention which, in order to maintin better resistance against corrosion, are added to lubricants or lubricating greases which demand high pressure and temperature resistance of the film. 2 to 10, especially 6% by weight sulphur are preferably added. For the same purpose it is also desirable to add organic sulphur compounds as sulphides and preferably dihydroxyalkyl sulphides, e.g. dihydroxyethyl sulphide with an amount of 2 to 10, especially 6% by weight. Unsubstituted organic sulphides, e.g. diethyl sulphide, may also be added. In adding these compounds higher resistance against corrosion is obtained especially in the case of bore and cutting oils, ball bearing greases etc., these lubricants being used at high pressures and temperatures.

The ordinary and main composition given above corrodes a little copper, brass and tin. This corrosion may be substantially prevented by adding to the composition 2-mercaptobenzothiazole or sodium-2-mercaptobenzothiazole at 35 to 150° C., preferably at 100° C.

The composition according to the invention is prepared by reacting the acids and/or esters thereof, e.g. fats, as a first step with one or more saltforming and alkaline substances, the reaction mixture as a second step being reacted with polyhydric alcohols and then adding to it one or more alkaline reacting substances and one or more acids and/or esters of the acid or the acids, e.g. fats, the mixture as a third step being reacted.

In preparing the composition there are several alternative processes. As a first step the fatty acids and/or mixtures of fatty and rosin acids or the esters thereof may thus be reacted and then as a third step the fatty acids and/or the esters of the fatty acids, e.g. fats, may be reacted, or as a first step rosin acids or polymerized acids thereof only and as a third step the fatty acids and/or their esters, e.g. fats, may be reacted. Further, as the first and third steps, it is possible to react amines only, e.g. triethanolamine, or as the first step to react alkali metal hydroxides, e.g. sodium hydroxide or potassium hydroxide, and as the third step an amine only, e.g. triethanolamine. The reaction of the three steps is carried out at elevated temperatures and optionally in the presence of suitable catalysts known per se. The reaction of the first step is carried out when reacting fatty acids or fats at a temperature between 80 and 180° C. and especially at about 100° C. and when reacting rosin acids especially at about 170° C. The esterification reaction of the second step is preferably achieved at a temperature of 150 to 200° C. and especially at about 180° C. At the third saltforming or reesterification step the reaction is achieved at a temperature of 150 to 200° C. and especially within the range of 160 to 180° C. As a preferred catalyst in the steps of esterification and reesterification there may be mentioned tin tetrachloride.

In preparing the composition of the invention, as the first step 1 to 20% by weight alkaline reacting substances based on the reacting organic acids are reacted, as the second step 8 to 15% of a polyhydric alcohol being reacted with the organic acids given above based on the acid originally charged. As the third step 10 to 80% of the reaction mixture is mixed with 90 to 20% alkaline reacting substances, and 5 to 20% acid or ester, e.g. a fat, is intermixed and reacted.

Sulphur or the organic sulphur compounds are preferably added during the esterification step.

The reaction product finally obtained may be buffered to a suitable pH-value and may then also be slightly acid and used as an excellent corrosion preventing agent.

The invention is illustrated but not limited by the following examples, parts being parts by weight.

EXAMPLE 1

100 parts tall oil fatty acid being a refined tall oil containing about 15% rosin acids are mixed with 8 parts triethanolamine and heated at about 100° C. during 30 minutes. The temperature being decreased to 50° C., 12 parts polyglycol of the polymerization degree of about 10 ethylene glycol units are thereafter added to the mixture. The esterification is achieved at about 180° C. during about 2 hours. 50 parts of the reaction mixture obtained are mixed with 50 parts triethanolamine and 5 parts wool fat and heated during about 2 hours at 160° C. The product obtained is buffered to a pH-value of 5.5. Table 1 below shows corrosion tests carried out.

EXAMPLE 2

100 parts polymerized abietic acid are mixed with 4 parts caustic potash of 40° Bé. and heated during 30 minutes at 170° C. The temperature being decreased to 150° C., 12 parts polyglycol of the composition given in Example 1 then are added and esterification reaction is achieved at about 180° C. during about 2 hours.

45 parts of the reaction product given above are mixed with 55 parts triethanolamine and 5 parts beeswax and are heated during 2 hours at about 180° C. The product obtained being the rust inhibiting agent of the invention is buffered to a pH-value of 7.5. Table 1 below shows the result of the tests carried out.

EXAMPLE 3

100 parts abietic acid are mixed with 4 parts caustic potash of 40° Bé. and are heated at 170° C. during 30 minutes. The temperature being decreased to 150° C., 12 parts polyglycol of the composition given in Example 1 then are added and the product is heated during 2 hours at 180° C. 45 parts of the reaction product are mixed with 55 parts triethanolamine and 5 parts wool fat and is heated during 2 hours at 180° C., the product being buffered to a pH-value of 6. Table 1 below shows the result of the tests.

EXAMPLE 4

The procedure of this example is the same as for Example 2 except that caustic soda is used instead of caustic potash. Table 1 below shows the result of the corrosion tests.

EXAMPLE 5

The procedure of this example is the same as for Example 1 except that beeswax is used instead of wool fat. Table 1 below shows the result of the corrosion tests.

EXAMPLE 6

The procedure of this example is the same as for Example 3 except that glycerol is used instead of polyglycol. Table 1 below shows the result of the corrosion tests.

The corrosion or rust preventive tests were carried out according to the method of Lloyd and Beeny, the rusting of the test plates being given as values from 10 to 1, 10 representing a completely acceptable rust preventive property of the agent. The tests were carried out during 48 hours, blind test plates always being used. The plates were treated with a water solution of the rust inhibiting agent according to the examples above, said solution containing on the one hand 1% and on the other 0.5% of the rust preventive agent. Table 1 below shows the results of the tests.

*Table 1*

| Rust preventive agent according to — | Rust preventive effect at a concentration of — | |
|---|---|---|
| | 1% | 0.5% |
| Example 1 | 10 | 10 |
| Example 2 | 7 | 4 |
| Example 3 | 9 | 7 |
| Example 4 | 9 | 7 |
| Example 5 | 9 | 7 |
| Example 6 | 7 | 4 |

In all cases a rust preventive value of 1 was obtained for the plates parallelly investigated in water without a rust preventing agent. Table 1 thus indicates that the rust preventing compositions according to the invention are of perfectly valid quality.

The examples and Table 2 below show the preparation and testing of compositions also containing sulphur or sulphur compounds.

EXAMPLE 7

3% by weight, based on the weight of the final composition, a mercaptobenzothiazole are added to tall oil fatty acid subsequently polymerized at about 150 to 160° C. The subsequent reactions are carried out according to Example 1.

EXAMPLE 8

Polymerized tall oil fatty acid is polymerized and esterified with polyethylene glycol. After the temperature has decreased to 130–150° C., 3% by weight, based on final product, of sulphur are added. The other reactions follow those of Example 1.

EXAMPLE 9

3% diethyl sulphide are added at 85 to 90° C. to the final product obtained according to Example 1.

The products obtained according to Examples 7 to 9 were tested in the following way. Plates of copper and iron were immersed in a mixture of water and methylated spirit (red spirit), 0.8% by weight of the composition of the invention being added to the mixture. The decrease (—) and increase (+) of the weight of the plates were determined after 1 month. Table 2 below shows the results of the tests.

*Table 2*

| Rust preventive compositon accroding to Example | Plate material | Difference in weight, percent |
|---|---|---|
| No preventive agent added | copper | +0.026 |
| Do | iron | −0.266 |
| 1 | copper | +0.030 |
| 1 | iron | +0.010 |
| 7 | copper | +0.005 |
| 7 | iron | +0.005 |
| 8 | copper | +0.009 |
| 8 | iron | +0.004 |
| 9 | copper | +0.008 |
| 9 | iron | +0.005 |

The figures of the table indicate that the compositions according to the invention including sulphur or organic sulphur compounds are highly effective in preventing corrosion of copper and iron.

What we claim is:

1. A process of making a corrosion inhibiting composition, characterized in first reacting 1–20 parts by weight of triethanolamine and then 8–15 parts by weight of polyethylene glycol with about 10 ethylene glycol units with a total of 100 parts by weight of higher carboxylic acids, said carboxylic acids being selected from the group consisting of fatty acids obtained from animal fats, vegetable fats, wool fat and beeswax fat, tall oil fatty acids and refined tall oil fatty acids, the reaction taking place at a temperature of from about 150° to about 200° C.

2. A process as defined in claim 1, characterized, after the reaction of the carboxylic acids with triethanolamine and polyethylene glycol has taken place, in adding 2 to 10% by weight of sulphur.

3. A process as defined in claim 1, characterized, after the reaction of the carboxylic acids with triethanolamine and polyethylene glycol has taken place, in adding 2 to 10% by weight of diethyl sulphide.

4. A process as defined in claim 1, characterized, after the reaction of the carboxylic acids with triethanolamine and polyethylene glycol has taken place, in adding 2 to 10% by weight of dihydroxyethyl sulphide.

5. A process as defined in claim 1, characterized, after the reaction of the carboxylic acids with triethanolamine and polyethylene glycol has taken place, in adding 0.1 to 5% by weight of 2-mercaptobenzothiazole.

6. A process as defined in claim 1, characterized, after the reaction of the carboxylic acids with triethanolamine and polyethylene glycol has taken place, in adding 0.1 to 5% by weight of sodium 2-mercaptobenzothiazole.

References Cited in the file of this patent

UNITED STATES PATENTS

| | | |
|---|---|---|
| 1,970,564 | Hoover | Aug. 21, 1934 |
| 2,151,353 | Montgomery | Mar. 21, 1939 |
| 2,443,578 | Fuller | June 15, 1948 |
| 2,580,036 | Matuszak | Dec. 25, 1951 |
| 2,649,415 | Sundberg | Aug. 18, 1953 |
| 2,686,713 | White | Aug. 17, 1954 |
| 2,691,631 | Metter | Oct. 12, 1954 |
| 2,736,658 | Pfohl | Feb. 28, 1956 |
| 2,742,369 | Hatch | Apr. 17, 1956 |
| 2,805,201 | Fischer | Sept. 3, 1957 |